United States Patent [19]

Nakamura et al.

[11] Patent Number: 5,790,266
[45] Date of Patent: Aug. 4, 1998

[54] TRANSMITTING METHOD IN FACSIMILE

[75] Inventors: Mitsuhiro Nakamura; Koichi Shibata; Masakazu Oyama; Toshihiro Mori, all of Osaka, Japan

[73] Assignee: Mita Industrial Co., Ltd., Osaka, Japan

[21] Appl. No.: 707,579

[22] Filed: Sep. 5, 1996

Related U.S. Application Data

[63] Continuation of Ser. No. 242,622, May 13, 1994.

[30] Foreign Application Priority Data

May 28, 1993 [JP] Japan .................. 5-151521

[51] Int. Cl.[6] .................. H04N 1/00; H04N 1/32
[52] U.S. Cl. .................. 358/434; 358/435; 358/440; 358/442; 379/93.31; 379/106.01
[58] Field of Search .................. 358/434, 435, 358/436, 438, 439, 405, 406, 440, 468, 442, 444; 379/100.01, 102.07, 93.18, 93.28, 93.37, 106.01, 93.31

[56] References Cited

U.S. PATENT DOCUMENTS

| | | | |
|---|---|---|---|
| 4,058,672 | 11/1977 | Crager et al. | 358/435 |
| 4,908,851 | 3/1990 | Kotani et al. | 358/434 |
| 4,910,610 | 3/1990 | Utsugi | 358/435 |
| 4,922,524 | 5/1990 | Baba et al. | 538/435 |
| 5,025,469 | 6/1991 | Bingham | 379/98 |
| 5,150,400 | 9/1992 | Ukegawa | 358/438 |
| 5,303,066 | 4/1994 | Kawaguchi | 358/440 |
| 5,349,579 | 9/1994 | Madonna et al. | 370/58.2 |
| 5,359,644 | 10/1994 | Tanaka et al. | 379/96 |
| 5,444,770 | 8/1995 | Davis et al. | 379/99 |

*Primary Examiner*—Edward L. Coles
*Assistant Examiner*—Madeleine Au Nguyen
*Attorney, Agent, or Firm*—Beveridge, DeGrandi, Weilacher & Young, LLP

[57] ABSTRACT

In the present invention, a transmission control procedure from the time when a calling facsimile receives a digital identification signal from a called facsimile to the time when the calling facsimile transmits a facsimile message is carried out by control signals using tone signals. For example, the calling facsimile sends out to the called facsimile a first control signal indicating that facsimile transmission should be performed through a particular procedure if it receives the digital identification signal from the called facsimile. The called facsimile sends to the calling facsimile, if it receives the first control signal, a second control signal indicating that the first control signal is received. The calling facsimile sends out to the called facsimile a third control signal indicating that a facsimile message should be sent and then, sends out the facsimile message to the called facsimile if it receives the second control signal.

3 Claims, 5 Drawing Sheets

1

TRANSMITTING METHOD IN FACSIMILE

This application is a continuation of application Ser. No. 08/242,622, filed May 13, 1994.

BACKGROUND OF THE INVENTION

1. Field of the Invention

The present invention relates to a transmitting method in a facsimile.

2. Description of the Prior Art

FIG. 1 shows a conventional facsimile communication procedure.

If a called facsimile is connected to a network by calling the called facsimile from a calling facsimile, the called facsimile sends out a non-standard facilities (NSF) signal, a called subscriber identification (CSI) signal and a digital identification signal (DIS).

The calling facsimile receives the above described signals and then, sends out a transmitting subscriber identification (TSI) signal and a digital command signal (DCS). In addition, the calling facsimile then sends out a training signal and a training check (TCF) signal.

The called facsimile sends out a confirmation-to-receive (CFR) signal if the adjustment of a high speed modem is completed. The calling facsimile sends out a coded facsimile message subsequently to the training signal if it receives the CFR signal.

The calling facsimile sends out an end-of-procedures (EOP) signal if it sends out all facsimile messages. The called facsimile sends out a message confirmation (MCF) signal if it receives the EOP signal. The calling facsimile sends out a disconnect (DCN) signal if it receives the MCF signal.

The communication time of the facsimile is broadly divided into time required for image transmission and time required for transmission control procedure. The time required for image transmission is significantly shortened by realizing coding at a high compression rate and increase in the transmission rate, so that an image on one standard original of A4 size can be transmitted in six seconds. However, the time required for transmission control procedure follows the procedure of CCITT T.30. If procedures before and after the communication are added, therefore, it takes approximately 15 to 30 seconds.

SUMMARY OF THE INVENTION

An object of the present invention is to provide a transmitting method in a facsimile in which time required for transmission control procedure can be shortened.

A first transmitting method in a facsimile according to the present invention is characterized in that a transmission control procedure from the time when a calling facsimile receives a digital identification signal from a called facsimile to the time when th e calling facsimile transmits a facsimile message is carried out by control signals using tone signals. The transmission time of each of the control signals is set to, for example, several hundred milliseconds.

The above described control signals comprise, for example, a first control signal sent out from the calling facsimile and indicating that facsimile transmission should be made through a particular procedure, a second control signal sent out from the called facsimile when the called facsimile receives the first control signal and indicating that the first control signal is received, and a third control signal sent out from the calling facsimile when the calling facsimile receives the second control signal and indicating that a facsimile message should be sent.

A second transmitting method in a facsimile according to the present invention is characterized in that a calling facsimile sends out to a called facsimile a first control signal composed of a tone signal indicating that facsimile transmission should be made through a particular procedure if it receives a digital identification signal from the called facsimile, the called facsimile sends out to the calling facsimile a second control signal composed of a tone signal indicating that the first control signal is received if it receives the first control signal, and the calling facsimile sends out to the called facsimile a third control signal composed of a tone signal indicating that a facsimile message should be sent to the called facsimile and then, sends out the facsimile message to the called facsimile if it receives the second control signal.

The foregoing and other objects, features, aspects and advantages of the present invention will become more apparent from the following detailed description of the present invention when taken in conjunction with the accompanying drawings.

Figure 4A:
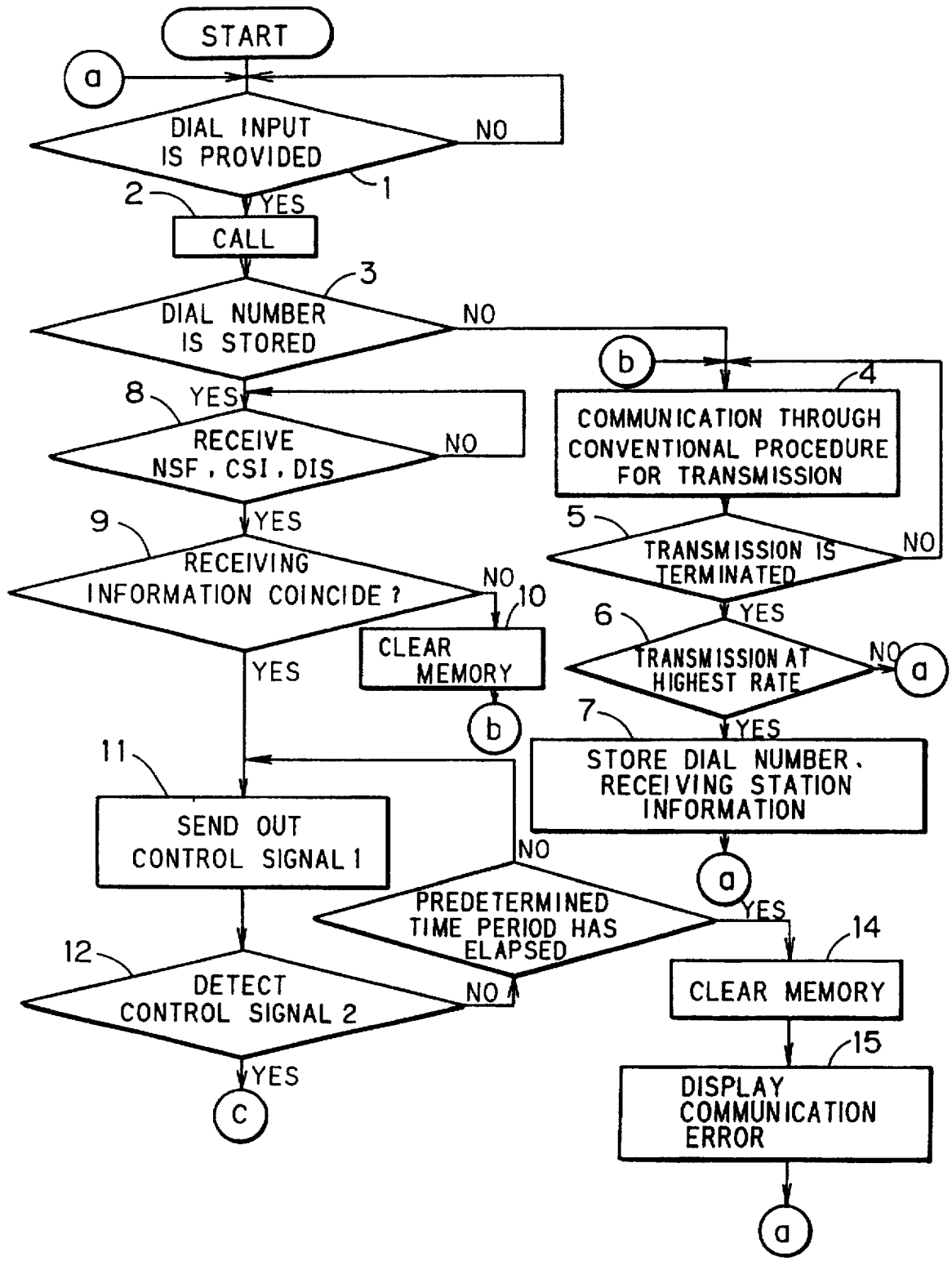
FIG. 4a is a portion of a flow chart showing a transmission processing procedure carried out by a control portion in a calling facsimile.

Page 4b is a continuation of the flow chart of FIG. 4a.

DETAILED DESCRIPTION OF THE PREFERRED EMBODIMENTS

Figure 2:
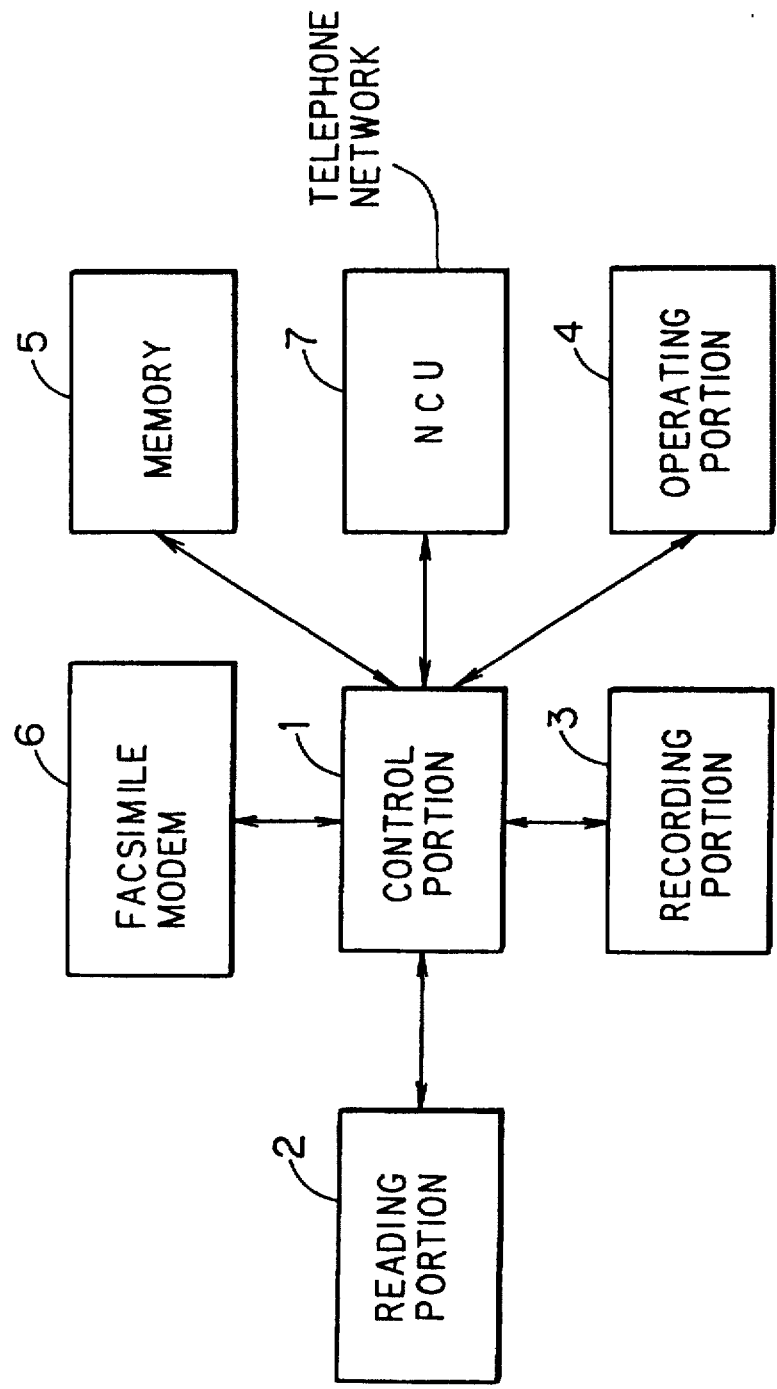
FIG. 2 is an electrical block diagram showing the schematic construction of a facsimile.
Figure 3:
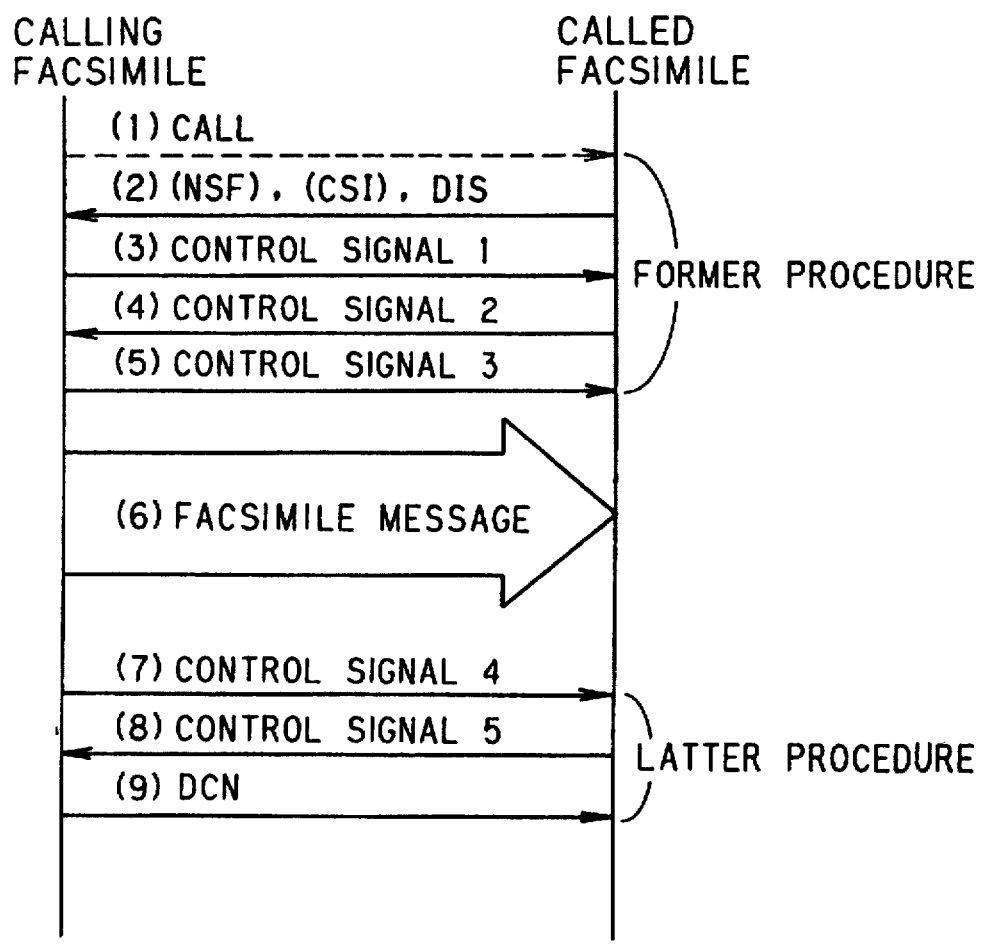
FIG. 3 is a sequence diagram showing a transmission procedure between facsimiles.

Referring now to FIGS. 2 to 4, embodiments of the present invention will be described.

FIG. 2 shows the schematic construction of a facsimile.

A facsimile is controlled by a control portion 1 constituted by a microcomputer and the like. The facsimile comprises as an input-output device of the control portion 1 a reading portion 2 for reading an original image, a recording portion 3 for recording a received image on recording paper, an operating portion 4 for performing a dial input operation including one-touch dialing and abbreviated dialing, a memory 5 storing dial information, communication information and the like, a facsimile modem 6 comprising a programmable tone sending and detecting function, and a network control unit (NCU) 7 for controlling a network.

FIG. 3 shows a transmission procedure between two facsimiles of the above described construction. A number enclosed in parentheses in FIG. 3 is a sequence number.

If a called facsimile is called from a calling facsimile (Sequence NO. 1), and the called facsimile is connected to a network, the called facsimile sends out an NSF signal, a CSI signal and a DIS signal (sequence NO. 2).

The calling facsimile sends out a tone signal (a control signal 1) indicating that transmission control should be carried out through a particular procedure according to the present embodiment if it receives the above described signals (sequence NO. 3).

The called facsimile sends out, if it receives the control signal 1, a tone signal (a control signal 2) indicating that the control signal 1 is received (sequence NO. 4).

The calling facsimile sends out a tone signal (a control signal 3) indicating that a facsimile message should be sent if it receives the control signal 2 (sequence NO. 5) and then, sends out the facsimile message (sequence NO. 6).

The calling facsimile sends, if it sends out all facsimile messages, a tone signal (a control signal 4) indicating that transmission of the facsimile messages is terminated (sequence NO. 7).

The called facsimile sends out, if it receives the control signal 4, a tone signal (a control signal 5) indicating that the control signal 4 is received (sequence NO. 8).

The calling facsimile sends out a DCN signal if it receives the control signal 5 (sequence NO. 9).

Figure 4B:
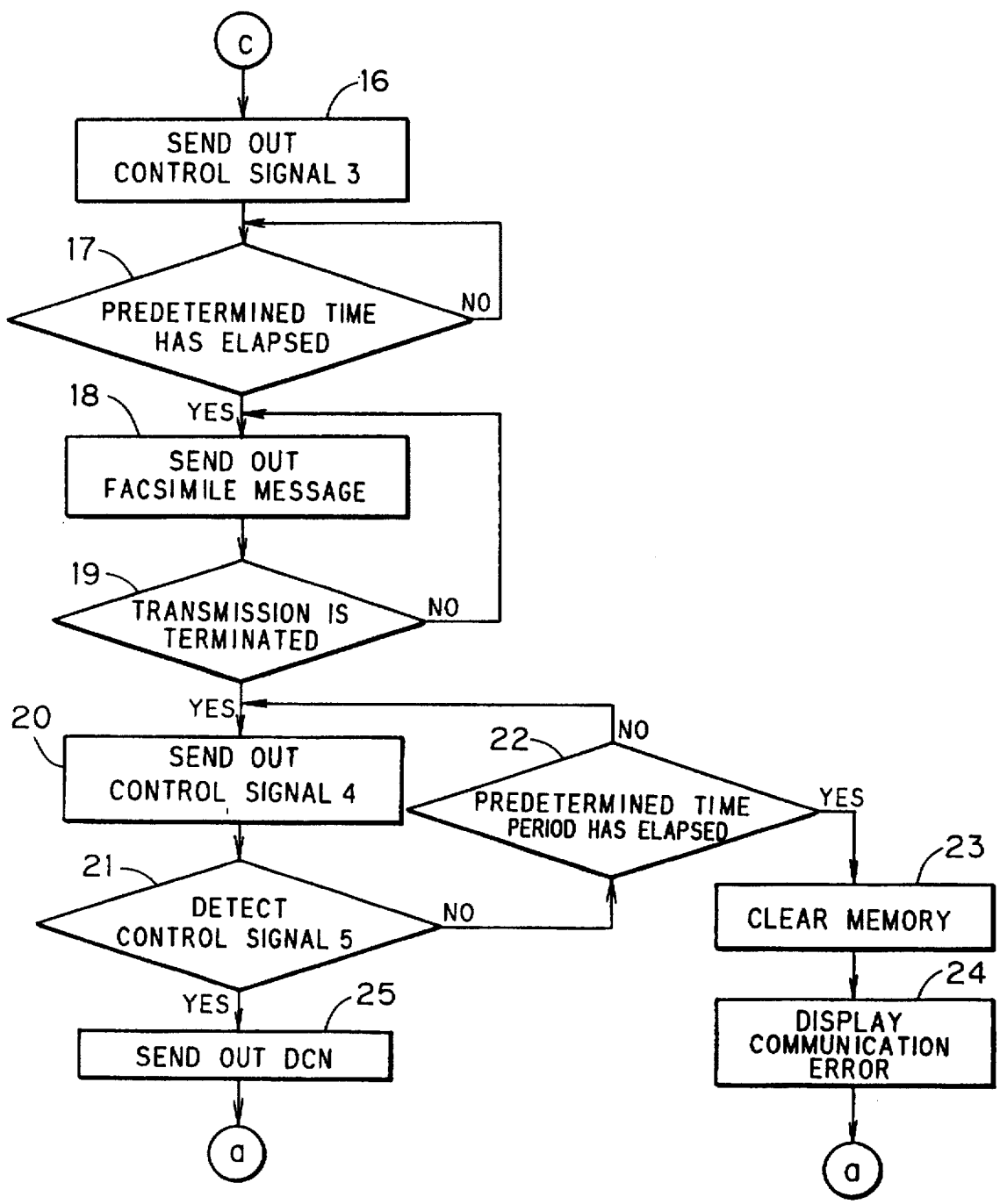

FIG. 4a and FIG. 4b together shows a transmission processing procedure carried out by the control portion 1 in the calling facsimile.

If facsimile communication is established using a particular procedure according to the present embodiment, the transmission rate is not checked between the calling facsimile and the called facsimile, as apparent from a transmission procedure shown in FIG. 3. When a certain facsimile is first called, therefore, facsimile communication is established in accordance with the conventional system. If facsimile communication is established at the highest transmission rate of the calling facsimile, a dial number, receiving station information and the like of the called facsimile are stored in the memory 5.

If the facsimile in which the dial number, the receiving station information and the like are stored in the memory 5 is called, the facsimile communication using the particular procedure according to the present embodiment is established.

The transmission processing procedure carried out by the control portion 1 in the calling facsimile will be described in detail.

If dial input is first provided from the operating portion 4 (step 1), a call is issued (step 2). In addition, it is judged whether or not a dial number is stored in the memory 5 (step 3).

If the dial number is not stored in the memory 5, facsimile communication is established through the conventional transmission control procedure (see FIG. 5) (step 4). If the facsimile communication is terminated (step 5), it is judged whether or not the facsimile communication is established at the highest transmission rate of the calling facsimile (step 6). This judgment is made on the basis of the results of a training check in the preceding procedure.

When the facsimile communication is not established at the highest transmission rate of the calling facsimile, the program is returned to the step 1. In the step 1, a dial input waiting state occurs. On the other hand, when the facsimile communication is established at the highest transmission rate of the calling facsimile, the dial number and the receiving station information of the called facsimile are stored in the memory 5 (step 7) and then, the program is returned to the step 1. In the step 1, a dial input waiting state occurs. The receiving station information shall be obtained herein from the NSF signal.

If the NSF signal, the CSI signal and the DIS signal from the called facsimile are received in a case where it is judged in the foregoing step 3 that the dial number is stored in the memory 5 (step 8), it is judged whether or not receiving station information included in the received NSF signal coincides with the receiving station information corresponding to the dial number stored in the memory 5 (step 9).

Figure 1:
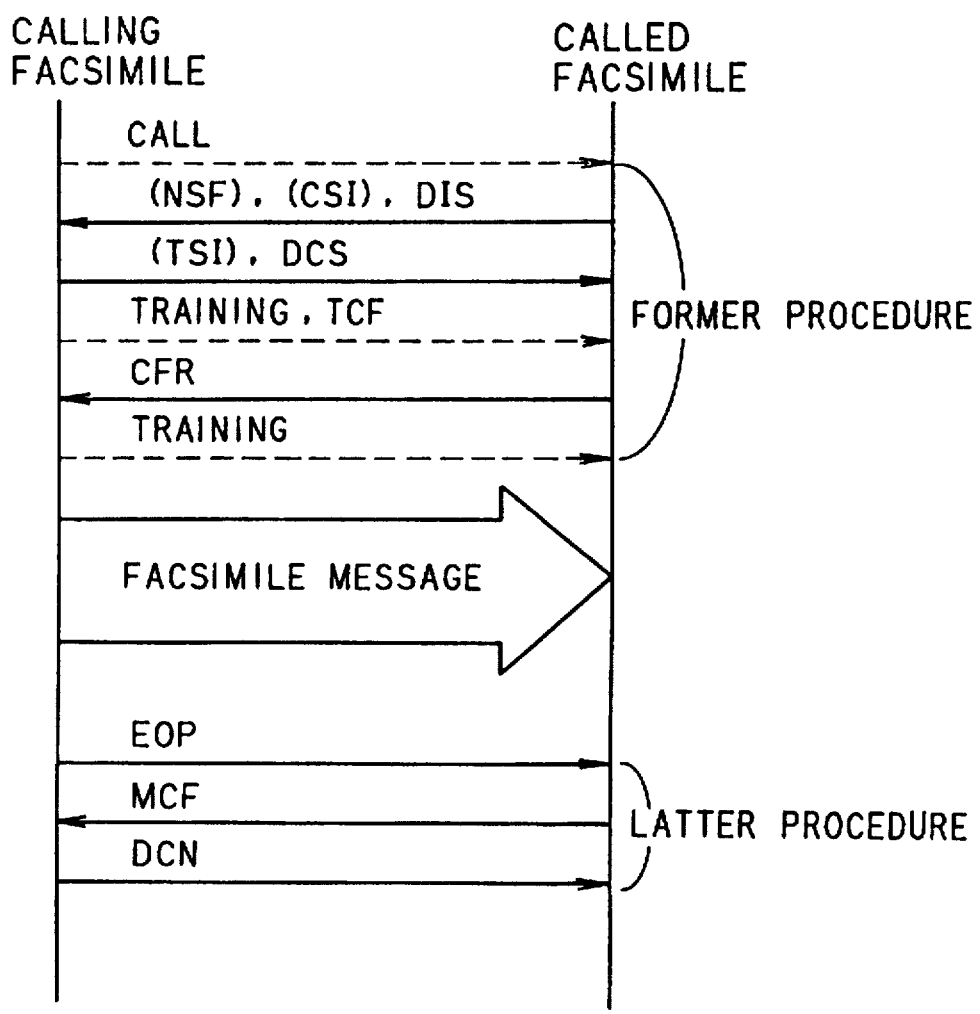
FIG. 1 is a sequence diagram showing a transmission control procedure in a conventional facsimile.

This judgment is made for judging whether or not the facsimile itself installed on the side of the receiving station is replaced. If received receiving station information differs from the receiving station information stored in the memory 5, it is judged that the facsimile itself is replaced, so that the dial number and the receiving station information of the receiving station which are stored in the memory 5 are cleared (step 10). The program then proceeds to the step 4. In the step 4, the facsimile communication is established through the conventional transmission control procedure (see FIG. 1).

If it is judged in the foregoing step 9 that the received receiving station information coincides with the receiving station information stored in the memory 5, the tone signal (the control signal 1) indicating that transmission control should be carried out through the particular procedure according to the present embodiment is sent out for a predetermined time period (for example, 500 msec) (step 11). The called facsimile sends out, if it receives the control signal 1, the tone signal (the control signal 2) indicating that the control signal 1 is received for a predetermined time period (for example, 600 msec).

When t he control signal 2 is no t detected within a predetermined time period (for example, 1 sec) elapsed since the control signal 1 was sent out in the foregoing step 11 (step 12), the program is returned to the step 11 again. In the step 11, the control signal 1 is sent out for a predetermined time period.

Even if the control signal 1 is repeatedly sent out in the above described manner, when the control signal 2 is not detected until a predetermined time period (for example, 3 sec) has elapsed since the control signal 1 was first sent out in the foregoing step 11 (YES in the step 13), the dial number and the receiving station information of the receiving station which are stored in the memory 5 are cleared (step 14). It is indicated on a display provided for the operating portion 4 that a communication error occurs (step 15) and then, the program proceeds to the step 1. In the step 1, a dial input waiting state occurs.

When the control signal 2 is detected in the foregoing step 12, the tone signal (the control signal 3) indicating that a facsimile message should be sent is sent out for a predetermined time period (for example, 20 msec) (step 16). If a predetermined time period (for example, 200 msec) has elapsed since the control signal 3 was sent out (step 17), the facsimile message is sent out (step 18).

If all the facsimile messages are sent out (step 19), the tone signal (the control signal 4) indicating that the transmission of the facsimile messages is terminated is sent out for a predetermined time period (for example, 500 msec) (step 20). The called facsimile sends out, if it receives the control signal 4, the tone signal (the control signal 5) indicating that the control signal 4 is received for a predetermined time period (for example, 600 msec).

When the control signal 5 is not detected within a predetermined time period (for example, 1 sec) elapsed since the control signal 4 was sent out in the foregoing step 20 (step 21), the program is returned to the step 20 again. In the step 20, the control signal 4 is sent out for a predetermined time period.

Even if the control signal 4 is repeatedly sent out in the above described manner, when the control signal 5 is not detected until a predetermined time period (for example, 3 sec) has elapsed since the control signal 4 was first sent out in the foregoing step 20 (YES in the step 22), the dial number and the receiving station information of the receiving station which are stored in the memory 5 are cleared (step 23). It is indicated on the display provided for the operating portion 4 that a communication error occurs (step 24) and then, the program proceeds to the step 1. In the step 1, a dial input waiting state occurs.

When the control signal 5 is detected in the foregoing step 21, a DCN signal is sent out (step 25) and then, the program proceeds to the step 1. In the step 1, a dial input waiting state occurs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transmitting method between a calling facsimile machine and a called facsimile machine, where the calling facsimile machine has a dial number storing means, a transmission rate selection means for selecting a transmission rate from a plurality of transmission rates, and a control signal transmission means where the calling facsimile machine has stored in the dial number storing means, the dial number of the called facsimile machine, said transmitting method comprising the steps of:

storing said dial number in said dial number storing means when a facsimile transmission is made at a highest rate of said calling facsimile machine and said dial number was not previously stored;

performing the following steps when said dial number is previously stored:

selecting the dial number of said called facsimile machine from said dial number storing means of said calling facsimile machine;

calling the called facsimile machine;

transmitting a first control tone signal from said calling facsimile machine to said called facsimile machine;

said called facsimile machine transmitting a digital identification signal to said calling facsimile machine and said calling facsimile machine receiving said digital identification signal from said called facsimile machine;

said called facsimile machine transmitting a second control tone signal to said calling facsimile machine, said second control tone signal indicating that said first control signal has been received, and said calling facsimile machine transmitting a third control tone signal to said called facsimile machine, said third control tone signal indicating that a facsimile message should be transmitted to said called facsimile machine upon receipt of said second control signal and then, said calling facsimile machine transmitting the facsimile message to said called facsimile machine.

2. A transmitting method between a calling facsimile machine and a called facsimile machine, where the calling facsimile machine has a dial number storing means, a transmission rate selection means for selecting a transmission rate from a plurality of transmission rates, a judging means for judging a non-standard facilities signal which contains information about the called facsimile machine and if the called facsimile machine can receive a transmission made at the highest available of said plurality of transmission rates, and a control signal transmission means where the calling facsimile machine has stored in the dial number storing means, the dial number of the called facsimile machine, and a control signal receiving means for receiving a control signal, said transmitting method comprising the steps of:

storing said dial number and a receiving station information in said dial number storing means when a facsimile transmission is made at a highest rate of said calling facsimile machine and said dial number was not previously stored;

performing the following steps when said dial number is previously stored:

selecting the dial number of the called facsimile machine from said dial number storing means of said calling facsimile machine;

calling the called facsimile machine;

transmitting a non-standard facilities signal and a digital identification signal to said judging means of said calling facsimile machine from said called facsimile machine;

determining if the facsimile non-standard facilities signal and digital identification signal coincide with information stored in said storing means;

when the facsimile non-standard facilities signal and digital identification signal coincide with information stored in said storing means, then:

transmitting a first control tone signal from said calling facsimile machine to said called facsimile machine;

transmitting a second control tone signal from said calling facsimile machine to said control signal receiving means of said calling facsimile machine, said second control tone signal indicating that said first control has been received, and said calling facsimile machine transmitting a third control tone signal to said called facsimile machine, said third control tone signal indicating that a facsimile message should be transmitted to said called facsimile machine upon receipt of said second control signal and then, said calling facsimile machine transmitting the facsimile message to said called facsimile machine after a predetermined time elapses.

3. A transmitting method between a calling facsimile machine and a called station, where the calling facsimile machine has a dial number storing means, a transmission rate selection means for selecting a transmission rate from a plurality of transmission rates, a judging means for judging a non-standard facilities signal which contains information about the called facsimile machine and if the called station can receive a transmission made at the highest available of said plurality of transmission rates, and a control signal transmission means where the calling facsimile machine has stored in the dial number storing means, the dial number of the called station, and a control signal receiving means for receiving a control signal, said transmitting method comprising the steps of:

storing said dial number and non-standard facilities signal including receiving station information in said dial number storing means when a facsimile transmission is made at a highest rate of said calling facsimile machine and said dial number was not previously stored;

performing the following steps when said dial number is previously stored:

selecting the dial number of the called station from said dial number storing means of said calling facsimile machine;

calling the called station;

transmitting a non-standard facilities signal and a digital identification signal to said judging means of said calling facsimile machine from said called station;

judging that the facsimile non-standard facilities signal does not coincide with information about said called station stored in said storing means;

clearing the dial number of the called station and the information containing non-standard facilities signal from said dial number storage means when the facsimile non-standard facilities signal does not coincide with information about said called station; and transmitting the facsimile communication to said called station through a normal transmission procedure.

* * * * *